Sept. 6, 1955 A. G. MERLIN ET AL 2,716,759
DIES FOR MAKING HEADED FASTENERS
Filed July 19, 1951

INVENTOR.
ALFRED G. MERLIN
BY JOSEPH P. MAMERE
Hudson, Boughton,
Williams, David & Hoffmann
ATTORNEYS United States Patent Office 2,716,759
Patented Sept. 6, 1955

2,716,759

DIES FOR MAKING HEADED FASTENERS

Alfred G. Merlin and Joseph P. Mamere, Cleveland, Ohio, assignors to The National Screw & Manufacturing Company, Cleveland, Ohio, a corporation of Ohio Application July 19, 1951, Serial No. 237,634

1 Claim. (Cl. 10—26)

The present invention relates to the manufacture of threaded fasteners of the so-called protruding head type, that is, fasteners the heads of which join the shanks at right angles thereto, such as, cap screws, machine bolts, etc., and its principal object is the provision of new and improved die or dies and method for the production of fasteners of the type referred to having recesses in their heads which render the heads elastically deflectible whereby the fasteners resist accidental loosening.

Another object of the invention is the provision of new and improved dies and method for forming the head of a headed and threaded fastener of the protruding type, such as, a cap screw or a machine bolt having a generally central recess and transverse grooves in the outer face of the head and having an annular recess or groove in the underside of the head adjacent to and surrounding the shank whereby the recess or recesses and grooves are formed simultaneously.

A further object of the invention is the provision of new and improved dies for forming screws or bolts of the character referred to which are durable and can be operated rapidly and accurately, thereby minimizing the cost of manufacturing the screws or bolts.

Other objects and advantages of the invention will be apparent from the following description of a preferred form of the invention, reference being made to the accompanying drawing wherein, Fig. 1 is a fragmentary view of a bolt showing the head portion thereof which has been manufactured according to the present invention, part of the bolt being shown in section;

Figure 1:
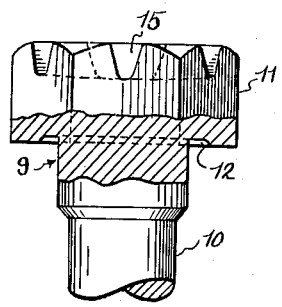
Figure 2:
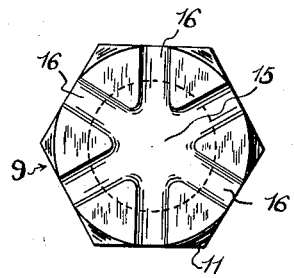
Fig. 2 is a plan view of the bolt shown in Fig. 1.

The invention is particularly adapted for the manufacture of screws or bolts having heads such as that illustrated by the bolt 9 shown in Figs. 1 and 2. Although the manufacture of a bolt is hereinafter described in detail, it is to be understood that a screw could be manufactured in a similar manner, and reference to "screw" herein is deemed to include "bolt" and vice versa. The head of the bolt 9 is of the so-called protruding type and is adapted to be elastically deflected when the under side or surface of the bolt head is drawn against the part to be secured thereby, which deflection places a thrust on the bolt which frictionally engages the threads of the bolt and the part into which it is threaded. Consequently, the friction between the threads resists unintentional rotation and loosening of the bolt.

In the form shown, the bolt 9 comprises a shank 10 having a head 11 thereon which is hexagonal in form and has an annular recess or groove 12 in the underface adjacent to the juncture of the shaft and the head. The outer or end face of the head has a recess which in its preferred form includes a central area 15 having radially extending grooves 16 projecting therefrom to the edges of the head. Preferably, the depth of the grooves 16 are approximately one-third the depth of the head and serve to somewhat weaken the head so that in conjunction with the annular groove 12, the peripheral portions of the head may be elastically deflected upwardly as viewed in Fig. 1 when the bolt head is drawn against the surface of a part to be secured by the bolt. This elastic deflection of the head maintains an axial thrust or pull on the shank of the bolt so that the threads thereof are maintained in tight engagement with the threads of the member into which the bolt is threaded.

Figure 3:
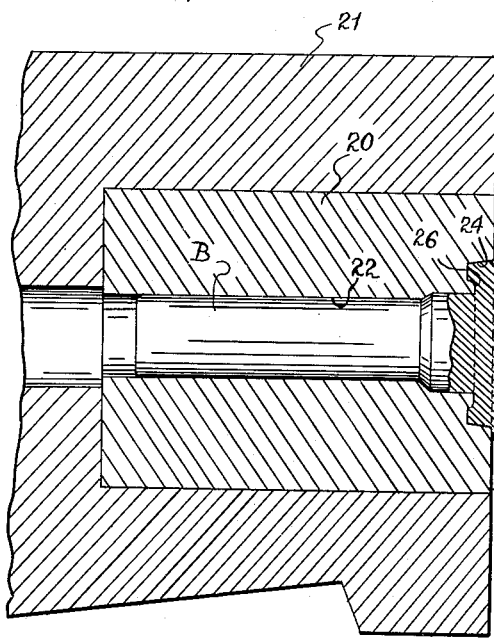
Fig. 3 is a fragmentary sectional view of punch and anvil dies forming a bolt head according to the present invention.
Figure 3:
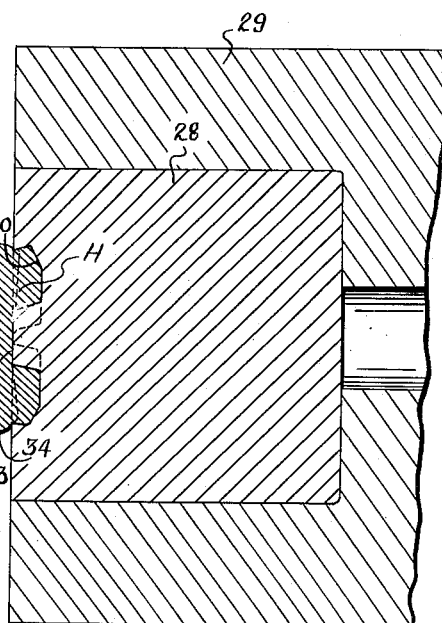

The present invention is directed to new and improved dies and method for forming bolts of the character described and contemplates provision of anvil and hammer dies which simultaneously form the groove 12 and the recess 15 and grooves 16 in one operation. Referring to Fig. 3, the anvil die which is shown at 20 has a suitable exterior form so that it may be received in the part 21 of a conventional heading machine, not shown. The anvil die has a central bore 22 which is shaped to receive the shank of a bolt blank B. Preferably, the dies are employed in a two-blow heading machine and a wire constituting the bolt blank is inserted in the opening 22 of the die 20 and the first blow of the hammer die upsets one end of the wire and forms a rough head, indicated at H. In the drawings the first hammer die is not shown since such dies are well known in the art.

The outer end of the die 20 has a cylindrical recess 24 for receiving and forming the lower portion of the head of the bolt. Preferably, the depth of the recess 24 is approximately one-third that of the depth of the bolt head and the sides thereof are tapered slightly inwardly to prevent sticking or jamming of the head in the recess. The bottom of the recess 24 has an annular ridge 26 which preferably extends about the shank receiving opening 22. The metal forming the recess 24 and ridge 26 is hardened so that the head of the bolt can be forced thereinto and cause the head to assume the shape of the recess and whereby the ridge 26 forms the groove 12 in the bottom face of the head.

The hammer or punch die is shown at 28 and it preferably comprises a block which is adapted to be received in the hammer 29 of the heading machine, and one face of the die has generally triangular or wedge shaped recesses 30 which are arranged within a circular area indicated at 31 and are defined by ridges or webs 32 which extend radially from a central portion 33 of the circular area. The ridges are preferably angularly spaced at sixty degrees from one another, although the angles therebetween would be otherwise if it were deemed suitable to provide more or fewer ridges. The diameter of the circular area 31 is preferably approximately that of the bolt head, and the portion of the punch within this area is in effect a punch die having the ridges 32 converging at 33 and which project from the plane of the inner walls of the recesses 30. It will be understood that the die punch 28 and particularly the portions 32, 33 thereof are hardened.

Figure 4:
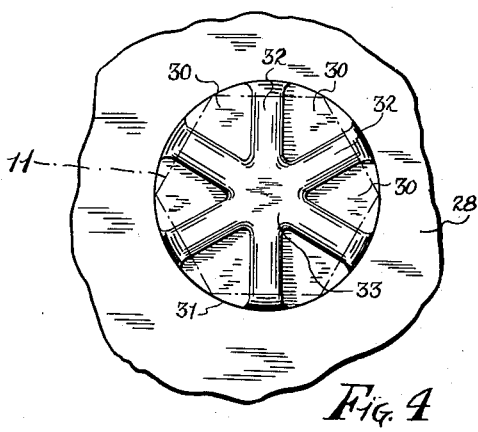
Fig. 4 is a fragmentary end view of the punch die.

In forming the head of the bolt, a suitable wire is fed into the anvil die 20 and the first blow of the heading machine upsets the outer end of the wire and forms a thickened or head portion after which the second blow of the heading machine moves the die 28 against the head, and the ridges 32 including the converging portion 33 penetrate the head approximately a third of the depth of the finished bolt head and form the grooves 16 and the central recess 15. During the second blow the metal of the head flows outwardly, as seen at 34 in Fig. 4, and the stroke of the die 28 is such that its closest approach to the die 20 is approximately one-third the depth of the head of the bolt. Simultaneously with the formation of the recess in the outer face of the bolt head, the metal of the head is forced into the annular recess between the walls of the recess 24 of the die 20 and the ridge 26 thereby forming the groove 12 in the underface of the head.

After the second blow of the heading machine which forms the groove 12 and the recess in the outer face of the head, the bolt is removed from the die 20 and the head is preferably trimmed or sheared to the desired form, such as the usual hexagonal shape. Alternatively, the head could be formed round if desired.

Preferably, the outer end portions of the ridges 32 slope inwardly to thereby decrease the depths of the grooves 16 toward the outer ends thereof; however, the ridges could be straight if desired.

It will be seen that by our invention we have provided new and improved dies and method of manufacturing screws or bolts having elastically deflectable heads, which heads can be economically and rapidly formed, and while we have described but one form of the invention, it is to be understood that other forms, adaptations and constructions could be employed, all of which fall within the scope of the claim which follows.

Having thus described our invention, we claim:

In apparatus for forming threaded fasteners of the protruding head type, a hammer die having a recess adapted to engage the outer end of the blank to shape the same, said recess being approximately one-third of the height of the head of the finished fastener, said recess having a central raised portion the projecting end of which is substantially flush with the portion of the hammer die surrounding said recess, three or more web-like ridges of substantially the same uniform height as that of said central raised portion arranged symmetrically with respect thereto and extending radially from said central raised portion to the side wall of said recess and adapted to be pressed along with said central raised portion into the outer end of the blank to form diagonal slots in the head of the blank the depth of which is approximately one-third of the height of the head of the finished fastener, and an anvil die having an aperture to receive the shank of the blank and a counterbore or recess to receive the head of the blank the inner or bottom wall of which recess has an annular ridge surrounding said aperture to form a recess in the underside of the head of the blank upon relative movement of said dies towards each other with a blank therein, the depth of the recesses in the anvil and hammer dies being substantially the same with said annular ridge extending above the bottom of the recess in the anvil die and terminating below the face of said anvil die.

References Cited in the file of this patent

UNITED STATES PATENTS

| | | |
|---|---|---|
| 162,642 | Frearson | Apr. 27, 1875 |
| 1,314,668 | Jaques | Sept. 2, 1919 |
| 1,896,837 | Campbell et al. | Feb. 7, 1933 |
| 2,125,272 | Erdman | Aug. 2, 1938 |
| 2,395,721 | Buchet | Feb. 26, 1946 |
| 2,543,705 | Place | Feb. 27, 1951 |